United States Patent
Hernando Saiz

(10) Patent No.: US 12,472,633 B2
(45) Date of Patent: Nov. 18, 2025

(54) MECHANICAL GRAPPLE FOR HIGH-PRESSURE PROCESSING CONTAINERS AND METHOD FOR HANDLING HIGH-PRESSURE PROCESSING CONTAINERS USING SAID MECHANICAL GRAPPLE

(71) Applicant: DESARROLLO DE MÁQUINAS Y SOLUCIONES AUTOMÁTICAS S.L. (DESMASA), Burgos (ES)

(72) Inventor: Carlos Hernando Saiz, Burgos (ES)

(73) Assignee: DESARROLLO DE MÁQUINAS Y SOLUCIONES AUTOMÁTICAS S.L. (DESMASA), Burgos (ES)

( * ) Notice: Subject to any disclaimer, the term of this patent is extended or adjusted under 35 U.S.C. 154(b) by 62 days.

(21) Appl. No.: 18/714,397

(22) PCT Filed: Nov. 30, 2021

(86) PCT No.: PCT/ES2021/070862
§ 371 (c)(1),
(2) Date: May 29, 2024

(87) PCT Pub. No.: WO2023/099794
PCT Pub. Date: Jun. 8, 2023

(65) Prior Publication Data
US 2025/0018575 A1    Jan. 16, 2025

(51) Int. Cl.
*B25J 9/16*    (2006.01)
*B25J 15/06*    (2006.01)

(52) U.S. Cl.
CPC ......... *B25J 9/1694* (2013.01); *B25J 15/0683* (2013.01)

(58) Field of Classification Search
CPC .... B25J 13/086; B25J 11/0045; B25J 15/024; B25J 15/0683; B25J 15/0066; B25J 15/0616; B25J 9/1694; B25J 15/0038
See application file for complete search history.

(56) References Cited

U.S. PATENT DOCUMENTS 7,551,981 B2 *  6/2009  Salamanca ............. B25J 9/1669
                                                    414/737
8,594,847 B2 * 11/2013  Schreiber ............... B25J 13/085
                                                    901/14

(Continued)

FOREIGN PATENT DOCUMENTS

| CN | 109693256 A | 4/2019 |
| JP | H08143098 A | 6/1996 |
| JP | 2020189370 A | 11/2020 |

OTHER PUBLICATIONS

Kiyokawa et al., Generation of a Tactile-based Pouring Motion Using Fingertip Force Sensors, 2019, IEEE, p. 669-674 (Year: 2019).*

(Continued)

*Primary Examiner* — Mcdieunel Marc
(74) *Attorney, Agent, or Firm* — Hayes Soloway P.C.

(57) ABSTRACT

The present invention relates to a mechanical grapple for high pressure processing containers and method for handling high pressure processing containers using said mechanical grapple intended to be adapted to an industrial robot, the grip object of the invention comprising a support structure, a control unit, a gripping mechanism and an opening mechanism that receive commands from said control unit so that the HPP container is immobilised through the use of closures by the gripping mechanism that embrace the HPP container, said container being transferable and combined with the action of removing the lid from the container in a coordi- (Continued)

nated manner through the use of fastening elements that are part of the opening mechanism.

8 Claims, 3 Drawing Sheets

(56) References Cited

U.S. PATENT DOCUMENTS

| | | | | |
|---|---|---|---|---|
| 10,149,729 | B2* | 12/2018 | Smaby | A61B 34/35 |
| 10,561,470 | B2* | 2/2020 | Hourtash | A61B 34/37 |
| 12,005,572 | B2* | 6/2024 | Mizoguchi | B65G 61/00 |
| 2009/0177324 | A1* | 7/2009 | Salamanca | B25J 9/1669 |
| | | | | 700/260 |
| 2013/0325182 | A1* | 12/2013 | Setrakian | B25J 9/161 |
| | | | | 700/264 |
| 2014/0028038 | A1 | 1/2014 | LaValley et al. | |
| 2015/0104284 | A1* | 4/2015 | Riedel | B25J 15/00 |
| | | | | 414/738 |
| 2020/0039091 | A1* | 2/2020 | Dahmouche | B25J 9/003 |
| 2022/0017316 | A1* | 1/2022 | Tiwary | B65H 3/047 |

OTHER PUBLICATIONS

Jipeng et al., Development of a Robotic Part Fixture Mechanism for PNP Operation in an Industrial Scenario, 2020, IEEE, p. 131- 135 (Year: 2020).*

Feng et al., Development of the interchangeable devices for space robot system, 2013, IEEE, p. 2055-2061 (Year: 2013).*

Vaganov et al., Development and Study of Automatic Gripping Mechanism of Bulky Material Packing System into Fabric Containers, 2019, IEEE, p. 1-5 (Year: 2019).*

* cited by examiner

MECHANICAL GRAPPLE FOR HIGH-PRESSURE PROCESSING CONTAINERS AND METHOD FOR HANDLING HIGH-PRESSURE PROCESSING CONTAINERS USING SAID MECHANICAL GRAPPLE

CROSS-REFERENCE TO RELATED APPLICATIONS AND PRIORITY

This patent application claims priority from International Patent Application No. PCT/ES2021/070862 filed Nov. 30, 2021.

OBJECT OF THE INVENTION

The object of the invention falls within the technical field of engineering, specifically within the field of mechanical engineering for developing special machines for industrial production.

Specifically, the object of the invention is a mechanical grapple that has the ability to immobilise and move a cylindrical container for treating products with high pressure, as well as to remove the lid of said container while immobilising and/or moving it.

BACKGROUND OF THE INVENTION

Installations made up of HPP (High Pressure Processing) equipment, which are used for processing packaged products and/or bulk liquids before packaging, are known in the state of the art.

Said HPP equipment uses containers for the correct handling of the product, these being of cylindrical geometry, including the products packed therein. The material features of the containers are particular to this technology.

One of the most important steps is the extraction of the packaged products already processed to subsequently carry out the distribution process of the products in the market.

The removal of the container lids can be carried out by an operator, physically uncovering the container to deposit or extract the products therein in order to distribute them to other production tasks units.

Once the products have been extracted, the empty containers are reloaded with product and thus perform the HPP processing cycle again.

Another way of removing the lids from HPP containers is by using container displacement tools and lid removal tools, independent from each other, increasing the efficiency of the process by reducing the time it takes for an operator to move the containers one by one by him or herself and remove the lid.

However, the problem that arises is the production time and with it the production cost when holding the container with a tool, on the one hand, moving it to another tool or equipment that enables the lid of the mentioned container to be opened.

Additionally, another problem is the production shutdown that can occur if the lid removal equipment fails, increasing production time, reducing the efficiency of the line and, therefore, increasing costs.

Another problem is the space occupied by the use of both tools, reducing the useful space for operators or for the installation of additional equipment necessary in the production process based on the operating conditions of the same.

DESCRIPTION OF THE INVENTION

The present invention aims to solve the aforementioned problems, including in one same tooling a mechanism that enables the fastening, movement and removal of the lid of HPP (High Pressure Processing) containers; in order to increase the efficiency of the task corresponding to said removal of the lid and the deposit of products for different purposes; and consequently, to reduce production times and possible errors derived from human error or failures when using different tools for the same task.

The invention relates to a mechanical grapple with the ability to move, fasten or immobilise and remove the lid of an HPP container simultaneously and in a coordinated manner, while describing the process carried out in that section of the production line.

The mechanical grapple, object of the invention, is equipped with a support structure that rests on the body of the HPP container, said support structure being made up of a longitudinal holding plate and an adapter with a series of holes geometrically made and configured for adapting to a manipulator, for example, an industrial robot, and attaching the support structure to the robot head, and with it, the fastening of the mechanical grapple to said manipulator so that it is moved.

Additionally, the mechanical grapple incorporates a control unit associated with a gripping mechanism, simulating the fingers of a hand, responsible for immobilising the HPP container so that it can be handled, by way of a claw that surrounds the container. This same control unit is also associated with an opening mechanism responsible for separating the lid from the body of said HPP container simultaneously and/or in a coordinated manner with the action of the gripping mechanism.

On the one hand, the gripping mechanism that is part of the mechanical grapple of the invention is equipped with a series of elements, these being plates acting by way of protection and fastening, separated from each other and which can be fastened on the holding plate of the support structure, by the ends of said plate or by areas close to the aforementioned ends.

Between the protective plates are located a series of actuators, which can be pneumatic or of another type; and linked thereto are moveable closures coupled between the protective plates with the ability to move pivotally with respect to said protective plates.

On the other hand, the opening mechanism is associated with the holding plate of the support structure, by means of articulated supports, positioned on the holding plate and at one end thereof, enabling the movement of the opening mechanism to be an articulated movement with respect to the support structure.

Likewise, the opening mechanism comprises another actuator, which is coupled at one end to the articulated support located on the holding plate of the support structure; a mechanism directing body, associated with the actuator by means of a rod integrated in said actuator; and associated with the holding plate by means of the articulated support located at the end.

In turn, the opening mechanism incorporates a gripping plate with a transversal shaft coupled to the directing body, the gripping plate having the ability to rotate around the transversal shaft thereof and being intended to make contact against the upper external surface of the lid in a fixed manner by means of gripping elements, said gripping elements being able to be suction cups, hooks, platens, etc.; so that the movement of the opening mechanism enables the lid to be removed from the HPP container while it is immobilised by the gripping mechanism.

The opening mechanism can also incorporate a series of actuators connected to the control unit and located in the central body, associated with the gripping plate by means of fastening cones, fixed to the gripping plate and to one end of the actuators. By means of the coordinated retraction and extension movement of said actuators, the movement for unlocking the closure of the lid occurs prior to the separation thereof from the body of the HPP container.

Both the action of immobilising the container by the gripping mechanism and that of removing the lid thereof are carried out due to the commands from the control unit, equipped with a control module and positioning sensors, located in the mechanisms and that send information on the presence and position of both the HPP container and the lid of said HPP container.

The sensors send the information to the control module, which sends the command to the actuators of both mechanisms, the actuators of the gripping mechanism are extended by pushing the closures at one of the ends thereof, enabling them to pivot and embrace the HPP container, immobilising it, its presence previously confirmed by means of the positioning sensors.

Once it is immobilised, the positioning sensor located in the opening mechanism sends information to the control module about the status of the lid of the HPP container, and the latter executes the command to move the actuator of said opening mechanism, enabling the rotation with respect to the articulated support located at the end of the holding plate by the directing body; and consequently by the gripping plate fixed to said body.

The opening mechanism, in turn, can incorporate an air suppression system that is connected to the set of suction cups established on the gripping plate, in the event that the gripping elements are suction cups. Once the command has been sent to said system, the lid is tied and the unlocking takes place for the separation thereof from the body of the HPP container.

By retracting the actuator, combined with fixing the lid to the gripping plate, said lid is removed from the container itself, ensuring that the entire deposition process of the products found inside the HPP containers is carried out in an agile and unified manner by one same tooling, being able to be carried out at the same time that the manipulator moves the whole assembly.

The extension and retraction action of the actuators that make up the gripping and opening mechanisms, as well as the system that enables the lid to be extracted, are governed by a series of solenoid valves and/or vacuum ejectors that are part of the control unit, linked to the control module, said control unit being able to be associated with the automaton thereof or in another location, enabling the extension and retraction commands to be sent to the actuators so that the movements are executed in a coordinated manner.

At the same time, the process of removing the lid from the HPP container and handling thereof is described, said process including the steps of positioning the mechanical grapple on the HPP container, detecting the presence of the container to subsequently send the information to the control unit, control unit which sends the command to the gripping mechanism to immobilise the HPP container.

At the same time as the step of gripping the container, the step of detecting the presence and position of the lid by means of the positioning sensors takes place, and once detected, the step of sending information to the control module takes place, control module which sends the command to the actuator of the opening mechanism to retract and thus be able to remove the lid of the container while it is fastened by the mechanical grapple. The opening of the lid can be carried out at any time during the handling of the assembly by the manipulator, i.e., the lid can be removed while the mechanical grapple is carried by the manipulator.

DESCRIPTION OF THE DRAWINGS

As a complement to the description provided herein, and for the purpose of helping to make the features of the invention more readily understandable, in accordance with preferred exemplary embodiments thereof, said description is accompanied by a set of drawings constituting an integral part of the same, which by way of illustration and not limitation, represent the following.

PREFERRED EMBODIMENT OF THE INVENTION

With the aid of the aforementioned figures, a preferred embodiment of the mechanical grapple for HPP (High Pressure Processing) containers and the handling process using said mechanical grapple is described.

Figure 1:
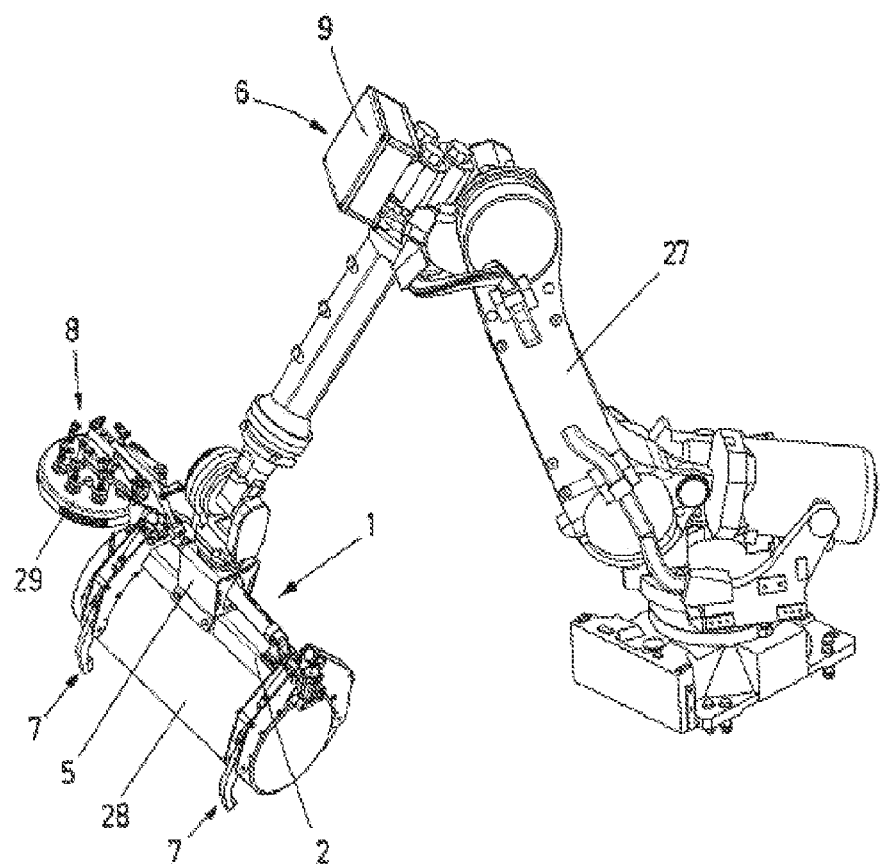
FIG. 1 shows a view of the mechanical grapple object of the invention coupled to a manipulator.

FIG. 1 shows a view of the mechanical grapple object of the invention, intended to be coupled to a manipulator (27) and to immobilise and open a HPP (High Pressure Processing) container equipped with a body (28) and a lid (29) that opens and closes said body (28), the mechanical grapple comprising a support structure (1) formed by a longitudinal holding plate (2) provided with a first end (3) and a second end (4), intended to be coupled to the HPP container body (28); and an adapter (5) that starts from the holding plate (2) and that is intended to couple the support structure (1) of the mechanical grapple to the industrial robot (27).

Additionally, the mechanical grapple comprises a control unit (6), a gripping mechanism (7) linked to the control unit (6), which is associated with the first and second ends (3, 4) of the holding plate (2) of the support structure (1), said mechanical grapple intended to immobilise the container when receiving commands from the control unit (6); and an opening mechanism (8) associated with the support structure (1) and linked to the control unit (6), the movement of which is articulated with respect to said support structure (1) and which is intended to open the body (28) of the HPP container by separating the lid (29) from the body (28) of the HPP container.

The control unit (6), in turn, comprises a control module (9) intended to send movement commands to the gripping mechanism (7) and/or to the opening mechanism (8), first positioning sensors (10) linked to the control module (9) and located in the gripping mechanism (7), said first positioning sensors (10) configured to detect the presence of the HPP container and send the information to the control module (9), and second positioning sensors (11) linked to the control module (9) and located in the opening mechanism (8), said second positioning sensors (11) configured to detect the presence of the lid of the HPP container and send the information to the control module (9).

Figure 2:
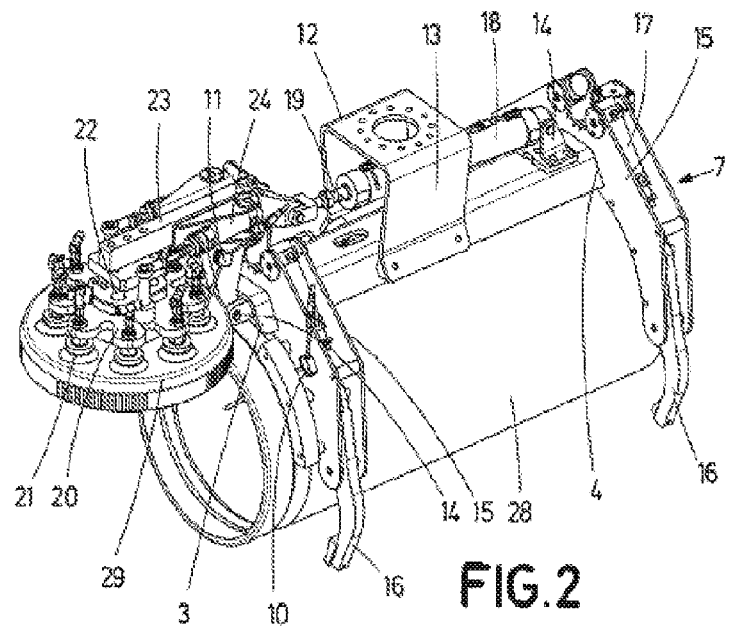
FIG. 2 shows a perspective view of the v object of the invention with the lid separated from the HPP container.

The aforementioned positioning sensors (10, 11) can be seen in FIG. 2, which shows a perspective view of the mechanical grapple wherein it is displayed how the adapter (5) is formed by a fixing plate (12) intended to be attached with the manipulator (27), said fixing plate (12) attached with the holding plate (2) by means of lateral fasteners (13), there being a space between the fixing plate (12) and the holding plate (2).

It is also shown how the holding plate (2) incorporates articulated supports (14) that facilitate the attachment of the opening mechanism (8) to said holding plate (2) and enable the articulated movement of the opening mechanism (8), at least one articulated support (14) being able to be located at the first end (3) of the holding plate (2) of the support structure (1) and/or at least one articulated support (14) being able to be located on the holding plate (2) of the support structure (1).

Figure 3:
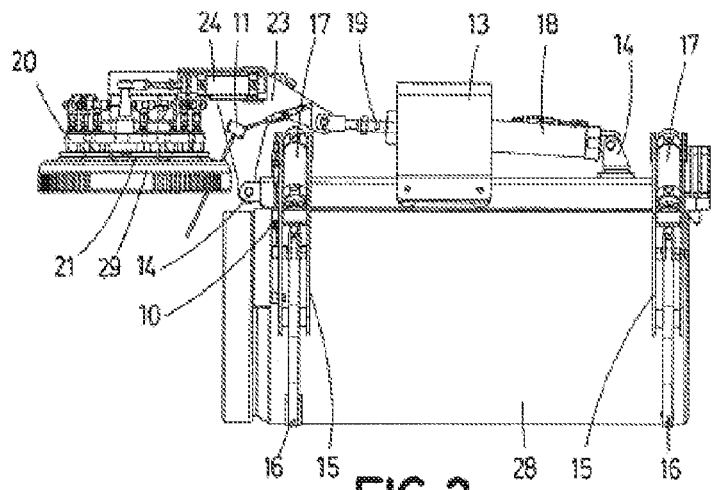
FIG. 3 shows a side view of the mechanical grapple object of the invention with the lid separated from the HPP container.

Likewise, for a better understanding of the invention, both FIG. 2 and FIG. 3 show the arrangement of the gripping mechanism (7) and the opening mechanism (8) as well as the elements that make them up.

On the one hand, the gripping mechanism (7) of the mechanical grapple comprises plates (15), separated from each other, which act as guides and are fixed on the vicinity of the ends (3, 4) of the holding plate (2), intended to adapt to the diameter of the body (28) of the HPP container, closures (16) coupled between the protective plates (15) and pivotally moveable with respect to said protective plates (15), intended to retain the HPP container, and first cylindrical actuators (17) associated with the closures (16) and connected to the control unit (6) that enable the closures (16) to move so that when the first actuators (17) extend, the closures (16) retain the HPP container; and when said first actuators (17) contract, the moveable closures (16) release the HPP container.

On the other hand, the opening mechanism (8) comprises a second actuator (18) coupled at one of the ends thereof to one of the articulated supports (14) of the holding plate (2) and connected to the control unit (6), arranged below the adapter (5); a gripping plate (20) equipped with fastening elements (21) and a transversal shaft (22), and which is intended to couple with the lid (29) of the HPP container.

The element that enables the movement of the gripping plate (20) is a directing body (23), which receives the transversal shaft (22) of the gripping plate (20) at one of the ends thereof and which couples at the opposite end thereof with the rod (19) of the second cylindrical actuator (18) and/or with the articulated support (14) located at the end of the holding plate (2).

Said directing body (23) is moveable in an articulated manner with respect to the holding plate (2) by means of the action of the second actuator (18), so that when the second cylindrical actuator (18) retracts, the rod (19) moves the directing body (23) that rotates with respect to the holding plate (2), and, consequently, moves the gripping plate (20), making it possible to separate the lid (29) from the body (28) of the HPP container.

Figure 4:
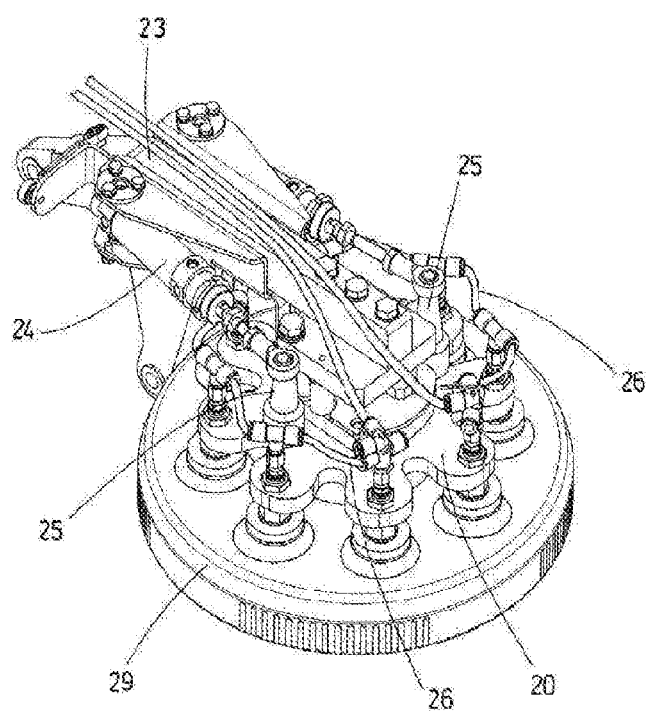
FIG. 4 shows a detailed view of the opening mechanism of the mechanical grapple.

FIG. 4 shows a detailed view of the opening mechanism, wherein the fastening elements (21) of the lid (29) are, preferably, a set of induced vacuum suction cups, and may also be other elements such as hooks, couplings, etc.

FIG. 4 also helps to show how the opening mechanism has the ability to rotate the lid (29) of the HPP container prior to removing it, by means of the use of third actuators (24) located on the sides of the directing body (23), connected with the control unit (6) and associated with the gripping plate (20) by means of fastening cones (25), which engage with the gripping plate (20), so that with the coordinated extension and retraction action of said third actuators (24) it enables the gripping plate (20) to rotate around the transversal shaft (22) thereof.

Finally, it is highlighted that the mechanical grapple object of the invention is associated with a method for handling HPP containers using said mechanical grapple, the method comprising the steps of:

positioning the mechanical grapple on the body (28) of the HPP container,
detecting the presence of the body (28) of the HPP container through the action of the first positioning sensors (10),
sending the information about the position of the body (28) of the HPP container to the control module (9),
detecting the presence of the lid (29) of the HPP container through the action of the second positioning sensors (11),
sending the information about the presence of the lid (29) of the HPP container to the control module (9),
sending a command to the gripping mechanism (7) to immobilise the body (28) of the HPP container,
immobilising the body (28) of the HPP container,
moving the HPP container to a programmed location,
sending a command to the opening mechanism (8) to remove the lid (29) from the HPP container, and
separating the lid (29) from the body (28) of the HPP container.

Likewise, the method may include the step of rotating the lid (29) of the container prior to separating the lid (29) from the body (28) of the HPP container to facilitate carrying out the method using the mechanical grapple.

The invention claimed is:

1. A mechanical grapple for high pressure processing containers intended to be coupled to a manipulator and to handle and open HPP (High Pressure Processing) containers that are equipped with a body and a lid that closes or opens said body, comprising:

a support structure,
a control unit,
a gripping mechanism linked to the control unit, intended to immobilize the body of the container when receiving commands from the control unit, and
an opening mechanism that is associated with the support structure, linked to the control unit, the movement of which is articulated with respect to said support structure and which is intended to open the HPP container by separating the lid from the body when receiving a command from the control unit,
wherein:
the support structure is equipped with:
a longitudinal holding plate comprising a first end and a second end; intended to be coupled to the body of the HPP container, and
an adapter that starts from the longitudinal holding plate and is intended to be coupled to the manipulator,
the gripping mechanism comprising:
protective plates which are fixed on the vicinity of the first end and of second end of the longitudinal holding plate intended to adapt to the diameter of the body of the HPP container, and
closures located between the protective plates in a pivotal manner with respect to said protective plates, intended to retain the body of the HPP container, and first actuators associated with the closures and connected to the control unit; that enable the closures to move so that when the first actuators extend, the closures retain the HPP container; and when said first actuators retract, the moveable closures release the HPP container.

2. The mechanical grapple for high pressure processing containers according to claim 1, wherein the control unit comprises:
   a control module intended to send movement commands to the gripping mechanism and/or to the opening mechanism,
   first positioning sensors linked to the control module and located in the gripping mechanism, said first positioning sensors configured to detect the presence of the body of the HPP container and send the information to the control module, and
   second positioning sensors linked to the control module and located in the opening mechanism, said second positioning sensors configured to detect the presence of the lid of the HPP container and send the information to the control module.

3. The mechanical grapple for high pressure processing containers according to claim 1, wherein the adapter is equipped with a fixing plate intended to be attached to the manipulator from which lateral fasteners start that are linked to the longitudinal holding plate, there being a space between the fixing plate and the longitudinal holding plate.

4. The mechanical grapple for high pressure processing containers according to claim 1, wherein the holding plate incorporates articulated supports that facilitate the attachment of the opening mechanism to said holding plate and enable the articulated movement of the opening mechanism, at least one articulated support being located at the first end of the holding plate of the support structure and/or at least one articulated support being located on the holding plate of the support structure, the opening mechanism comprising:
   a second actuator coupled at one of the ends thereof to one of the articulated supports of the longitudinal holding plate, connected to the control unit and equipped with a rod at an opposite end,
   a gripping plate comprising fastening elements and a transversal shaft, and which is intended to be coupled with the lid of the HPP container,
   a directing body that receives the transversal shaft of the gripping plate at one of the ends thereof and that couples at the opposite end thereof with the rod of the second actuator and/or with the articulated support located at the end of the longitudinal holding plate; said directing body being hingedly moveable with respect to the longitudinal holding plate through the action of the second cylindrical actuator, so that when the second actuator retracts, the rod moves the directing body in a hingedly manner with respect to the longitudinal holding plate, and consequently, moves the gripping plate, making the lid from the body of the HPP container separable.

5. The mechanical grapple for high pressure processing containers according to claim 4, wherein the fastening elements of the gripping plate are suction cups.

6. The mechanical grapple for high pressure processing containers according to claim 5, wherein the opening mechanism additionally comprises an air suppression system linked to the control unit, said air suppression system being intended to extract the air from the suction cups when they are in contact with the lid of the HPP container and fastening the suction cups to said lid.

7. The mechanical grapple for high pressure processing containers according to claim 4, wherein the second actuator is arranged below the fixing plate.

8. The mechanical grapple for high pressure processing containers according to claim 4, wherein the opening mechanism additionally comprises third actuators located on the sides of the directing body, connected with the control unit and associated with the gripping plate by fastening cones, which engage with the gripping plate, so that with the coordinated extension and retraction action of said third actuators enables the gripping plate to rotate around the transversal shaft thereof.

* * * * *